United States Patent [19]

Goodbary

[11] 4,082,363
[45] Apr. 4, 1978

[54] WHEEL RIM AND BRAKE DISC FOR OFF-HIGHWAY VEHICLES

[75] Inventor: Edgar R. Goodbary, Cardin, Okla.

[73] Assignee: Goodbary Engineering Company, Cardin, Okla.

[21] Appl. No.: 744,437

[22] Filed: Nov. 23, 1976

[51] Int. Cl.² .................................................. B60T 1/06
[52] U.S. Cl. ............................... 301/6 CS; 188/18 A;
  188/71.6; 301/6 E; 301/6 WB; 301/24
[58] Field of Search .................. 301/6 R, 6 CS, 6 E,
  301/6 WB, 11 R, 11 S, 12 R, 13 R, 135 M,
  18–22, 23–24, 63 R, 63 DD; 188/18 A, 218 XL,
  71.6, 264 AA, 71.1, 73.2

[56] References Cited

U.S. PATENT DOCUMENTS

| 2,109,722 | 3/1938 | Fawick | 188/264 AA X |
| 2,135,481 | 11/1938 | Brink | 301/19 X |
| 2,242,049 | 5/1941 | Ash | 188/18 A |
| 2,251,539 | 8/1941 | Ash | 188/264 AA X |
| 2,386,477 | 10/1945 | Kraft | 188/18 A X |

Primary Examiner—Trygve M. Blix
Assistant Examiner—Douglas C. Butler
Attorney, Agent, or Firm—Head, Johnson & Chafin

[57] ABSTRACT

A support member for a wheel rim of an off-highway vehicle for facilitating the independent securing of the large wheels and associated disc brakes to the vehicle, and a relief groove on the brake disc for dissipation of heat during a braking operation in order to eliminate or preclude fusing of the disc to stationary elements of the braking apparatus thus facilitating the removal of the disc for replacement or the like.

9 Claims, 5 Drawing Figures

WHEEL RIM AND BRAKE DISC FOR OFF-HIGHWAY VEHICLES

BACKGROUND OF THE INVENTION

1. Field of the Invention

This invention relates to improvements in wheel rims for large wheels of off-highway vehicles and to an improved brake disc for the disc braking apparatus associated with the large wheels.

2. Description of the Prior Art

Extremely large off-highway vehicles are becoming widely used in many industries, such as mining industry, large construction industry, and the like. The excessive size and weight of these vehicles has created many problems in the construction and operation thereof for both efficiency and safety purposes. Of course, the wheels of these vehicles are exceptionally large, usually requiring tires in excess of ten feet in diameter. It is frequently particularly advantageous to mount at least the front wheels of the vehicle independently, and the weight and loads carried by the wheels increases the difficulty of securing the wheels to the vehicle. In addition, it is preferable to provide a brake disc system for each wheel, operable independently of one another and so arranged that one brake mechanism will automatically be brought into service in the event of failure of the other brake mechanism. During a braking operation, it has been found that the disc generates a considerable amount of heat, and the metallic materials from which the disc is constructed frequently "seizes" the elements to which it is secured, or fuses thereto; and as a consequence, it is difficult, if not impossible, to remove the disc for replacement or repair. Usually the disc is completely destroyed during removal, which is an obvious disadvantage. In order to remedy this difficulty, an annular groove is frequently provided on the opposite faces of the brake disc in order to dissipate the heat. In actual use, however, it has been found that the groove disposed outboard, or on the engaging face of the disc, is substantially completely ineffective for heat dissipation since it is completely covered by the braking surfaces of the stationary brake elements, and the outboard groove is too far removed from the heating area to accomplish any heat dissipation.

SUMMARY OF THE INVENTION

The present invention contemplates a novel center support ring for the usual wheel rim in order to facilitate the mounting of the wheel to the vehicle in a manner for overcoming the normal difficulties encountered in these off-highway vehicles. In addition, a heat relief groove is provided in the inner periphery of the brake disc which efficiently dissipates the heat during a braking operation and substantially precludes any "seizing" of the mounting surfaces by the brake disc. Consequently, the disc may be readily removed from the support mechanism for replacement, repair, or the like. The novel center support for the wheel rim and brake disc groove is simple and efficient in operation and economical and durable in construction.

DESCRIPTION OF THE PREFERRED EMBODIMENT

Figure 1:
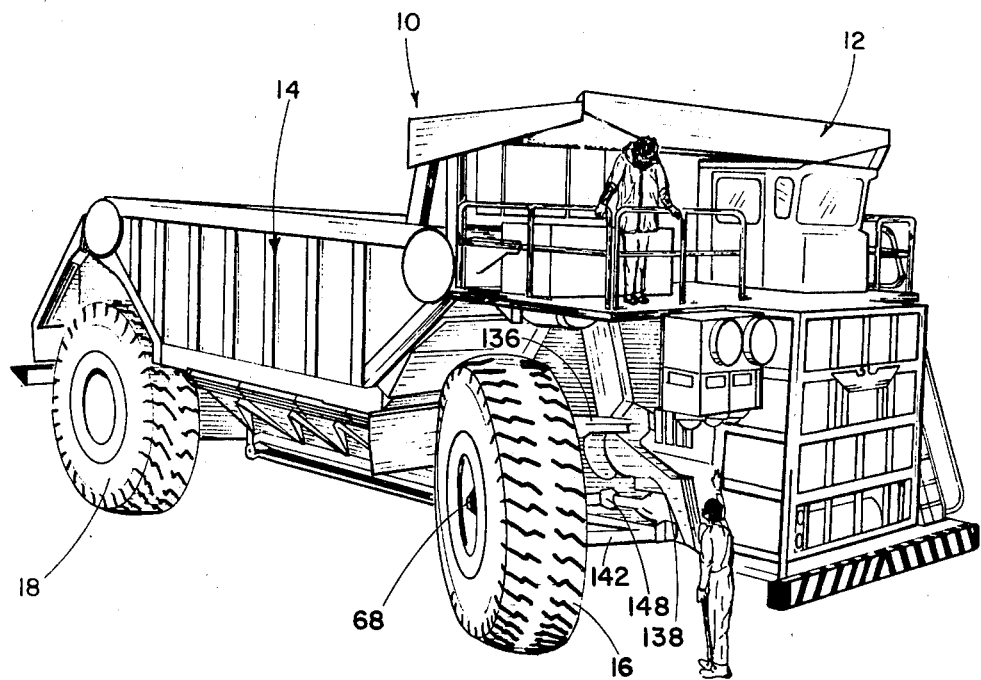
FIG. 1 is a right front perspective view of an off-highway vehicle having at least the front wheels thereon provided with a rim center support and brake disc embodying the invention.
Figure 2:
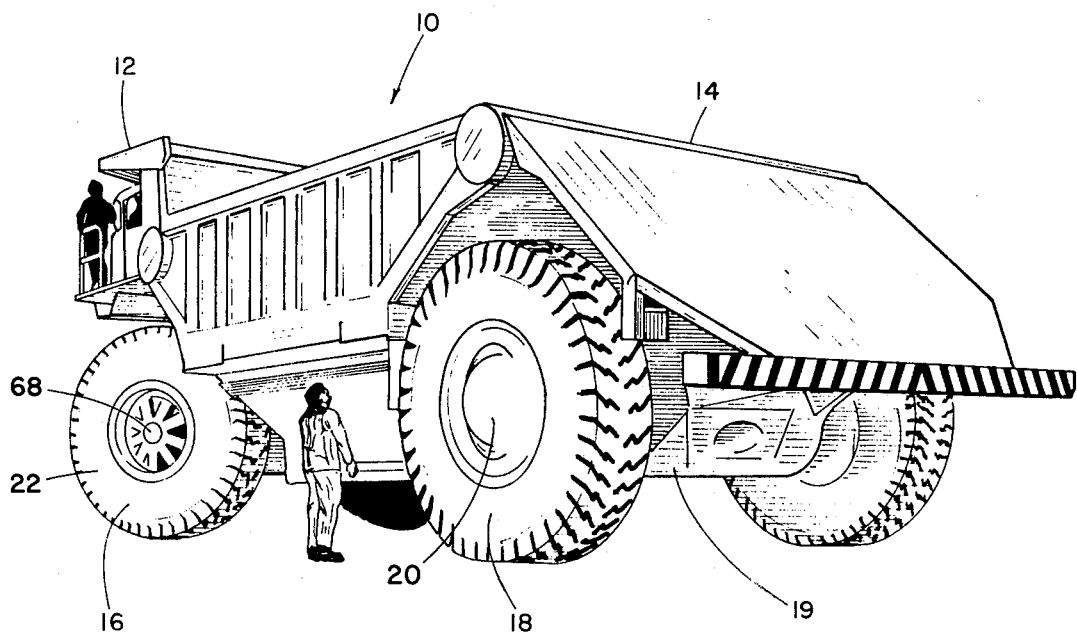
FIG. 2 is a left rear perspective view of an off-highway vehicle having at least the front wheels thereof provided with a rim center support and brake disc embodying the invention.

Referring to the drawings in detail, reference character 10 generally indicates an off-highway vehicle comprising a cab section 12, a dump body 14, a pair of front wheels 16 independently mounted on the opposite sides of the cab section 12 in a manner as will be hereinafter set forth, and also a pair of rear wheels 18 preferably journalled on the opposite ends of a common axle 19. In the particular embodiment depicted herein, each of the rear wheels 18 is driven by a suitable electric motor 20 centrally mounted within the wheel 18 as is well known in this type vehicle. The front wheels 16, however, are steering wheels, but are not powerdriven wheels.

Figure 3:
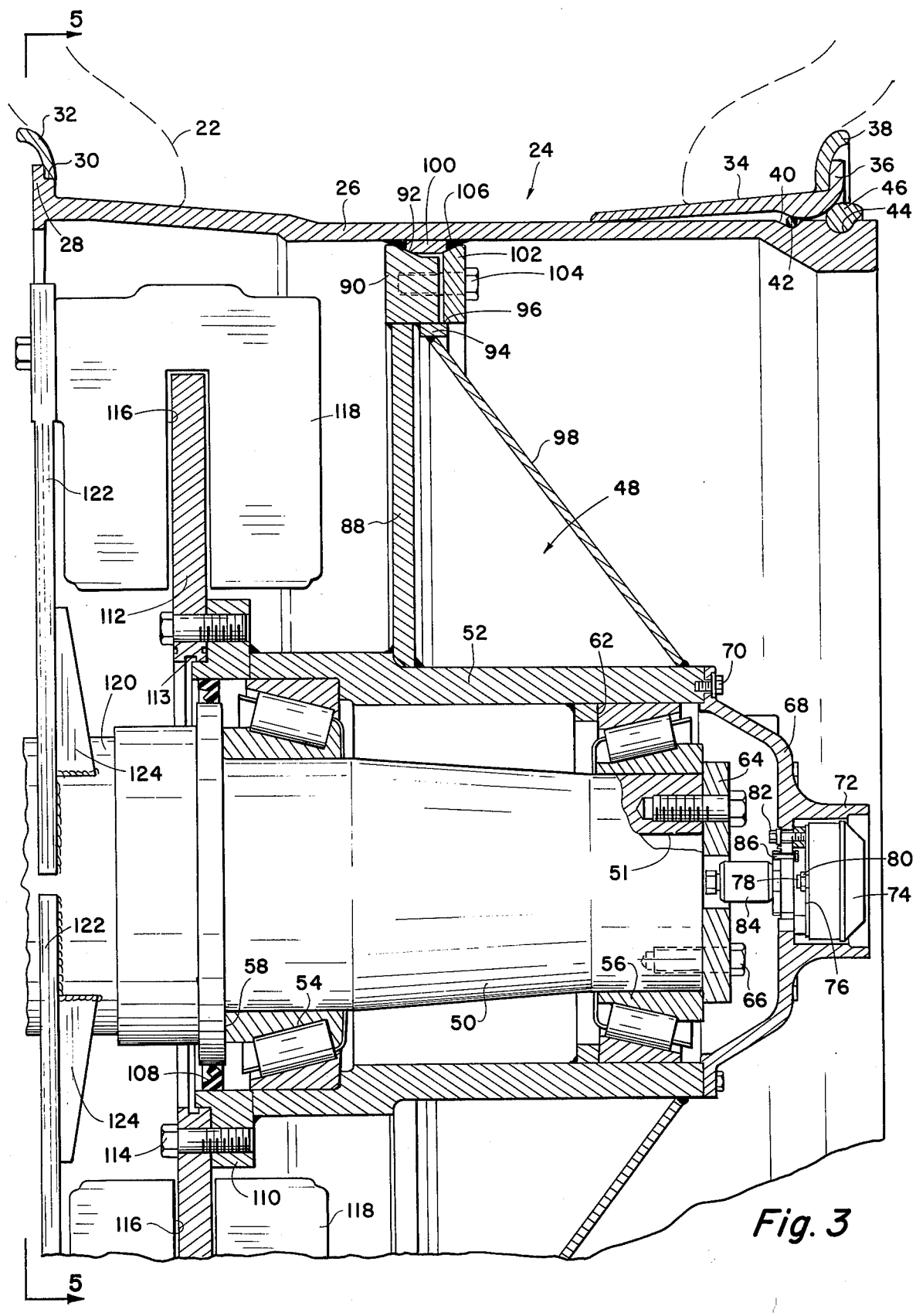
FIG. 3 is a broken sectional elevational view of a wheel rim having a center support embodying the invention and a disc brake mechanism having a brake disc embodying the invention.

Each wheel 16 comprises a tire 22 disposed around the outer periphery of the usual wheel rim 24 as particularly shown in FIG. 3. The wheel rim 24 may be of any suitable or well-known construction; and as shown herein, it comprises a substantially cylindrical sleeve 26 having an outer periphery of a diameter substantially equal to the inner diameter of the tire 22 as is well known. An outwardly extending circumferential flange 28 is provided around the outer periphery of the inboard end of the sleeve 26 for receiving the inboard side of the tire 22 thereagainst as shown in FIG. 3. The flange 28 is provided with an inwardly directed annular shoulder 30 for receiving the inner periphery of an arcuate annular ring member 32 thereon, said ring member being provided for supporting the edge of the tire 22 on the rim 24 as is well known.

A sleeve 34 is disposed around the outboard end of the sleeve 26 and is provided with a tapered outer periphery for receiving the outboard side of the tire 22 thereon as shown in FIG. 3. The outboard end of the sleeve 34 is provided with an outwardly extending circumferential flange 36 for retaining an arcuate annular ring member 38 in position against the outboard side of the tire 22 as is well known. A first annular groove 40 is provided around the outer periphery of the sleeve 26 in the proximity of the outboard end of the sleeve 34 for receiving an O-ring 42 therein. The O-ring 42 provides a seal between the sleeves 26 and 34 for precluding leakage of air from the interior of the tire 22. A second annular groove 44 is provided around the outer periphery of the sleeve 26 outboard of the groove 40 for removably receiving a lock ring 46 therein. The lock ring 46 securely retains the sleeve 34 and ring 38 in position on the sleeve 26 for retaining the tire on the rim 24, all of which is well known.

A center support means generally indicated at 48 is provided within the rim 24 for securing the rim 24 and tire 22 to the vehicle 10. The center support means 48 comprises a hollow spindloon stub axle member 50 centrally disposed within the sleeve 26 and having a central passageway 51 extending longitudinally therethrough. A substantially cylindrical housing 52 is concentrically disposed around the outer periphery of the axle 50. A suitable bearing assembly 54 is interposed between the left-hand end of the housing 52 and the axle 50 as viewed in FIG. 3, and a second suitable bearing assembly 56 is interposed between the right-hand end of the housing 52 and the axle 50, whereby the housing 52 is rotatably supported by the axle 50 for rotation about its own longitudinal axis.

The bearing assembly 54 is disposed against the outboard face of an outwardly extending circumferential shoulder 58 provided around the outer periphery of the axle 50 and is retained in position thereagainst by an inwardly directed annular shoulder 60 provided on the inner periphery of the housing 52. The bearing assembly 56 is disposed against an inwardly directed annular shoulder 62 provided on the inner periphery of the housing 52 in spaced relation from the shoulder 60 and is retained in position thereagainst by an annular plate member 64 which is removably secured to the outboard end of the axle 50 by a plurality of spaced bolts 66 or the like. A substantially cup-shaped cover member 68 is secured to the outboard end of the housing 52 by a plurality of circumferentially spaced bolts 70 or the like, to provide a dust cover for the axle 50 and bearing assemblies 54 and 56.

The dust cover 68 is provided with a centrally disposed sleeve member 72 extending axially outwardly therefrom in a direction away from the axle 50. A suitable hubodometer 74 of any well-known type, such as that manufactured by Engler Instrument Company, is centrally disposed within the sleeve 72 and is secured to a strap member 76 by a threaded stud member 78 and complementary lock nut 80. The strap 76 is secured to the dust cover 68 by a plurality of bolts 82, or the like for securely retaining the hubodometer 74 within the sleeve 72. The hubodometer 74 rotates simultaneously with the dust cover 68 but is "weighted" in order that upon cessation of the rotation thereof, the hubodometer will always be positioned in an upright position for facilitating reading of the numbers recorded therein, as is well known. In combination with the hubodometer, a suitable rotating union 84 is secured to the inboard side of the dust cover 68 and is secured thereby by bolts 86, or the like. The rotating union 84 may be of any suitable type, but it may be preferable to use a Deublin Rotating Union Model 1102-15 with a 1102-5 rotor. The rotating union 84 cooperates with the hubodometer 74 for providing a visible reading of the number of rotations of the housing 52, and thus of the wheel 16, all as is well known in the industry.

An annular plate 88 is welded or otherwise rigidly secured around the outer periphery of the housing 52 and interposed between the opposite ends thereof. An annular ring 90 is welded or otherwise rigidly secured around the outer periphery of the plate 88 and is of an outer diameter slightly less than the inner diameter of the sleeve 26. The outer periphery of the ring 90 is tapered as shown at 92 for a purpose as will be hereinafter set forth. A second annular ring 94 is welded or otherwise rigidly secured to the inner periphery of the ring 90 and spaced slightly outboard of the plate 88 to provide a substantially cylindrical shoulder 96 extending outwardly from the ring 90 for a purpose as will be hereinafter set forth. A substantially conical shaped cover member 98 is rigidly secured between the inner periphery of the ring 94 and the outer periphery of the outboard end of the housing 52 for protection of the inboard elements, as will be hereinafter set forth.

The ring 90 is disposed adjacent the inboard edge of a cylindrical ring member 100 which is welded to the inner periphery of the sleeve 26. The ring 90 is held in position against the ring 100 by an annular ring 102 which is disposed adjacent the outboard edge of the ring 100 and removably secured to the ring 90 by a plurality of spaced bolts 104, or the like. The outer periphery of the ring 100 is tapered in a manner corresponding to but opposite from the tapered portion 92 and as shown at 106 for a purpose as will be hereinafter set forth.

As particularly shown in FIG. 3, the inboard and outboard edges of the ring 100 are welded to the inner periphery of the sleeve 26, and the welded portions are machined, or the like, to a tapered configuration complementary to the tapered portions 92 and 106 for efficiently receiving the tapered portions 92 and 106 thereagainst. The ring 90 is positioned against the inboard taper of the ring 100, and the ring 102 is positioned against the outboard taper of the ring 100, and the rings 90 and 102 may be tightened securely together and against the respective tapered weld portions for securing the center support assembly 48 within the wheel rim 24. Of course, the rings 102 may be easily removed from engagement with the ring 90 for removal of the assembly 48 from the wheel rim 24 if it is necessary for any reason.

A suitable dynamic sealing means 108 is interposed between the outer periphery of the axle 50 and the inner periphery of the housing 52 spaced inboard of the bearing assembly 54 for sealing the interior of the housing 52 from the inboard side thereof. In addition, an outwardly extending circumferential flange 110 is provided around the outer periphery of the housing 52 at the inboard end thereof. An annular brake disc 112 is removably secured to the flange 110 in any suitable manner such as by a plurality of circumferentially spaced bolts 114, or the like. An annular recess or relief groove 113 is provided around the inner periphery of the disc 112. The brake disc 112 extends into the usual recesses 116 normally provided in disc-type brakes 118 for a purpose as will be hereinafter set forth.

Figure 5:
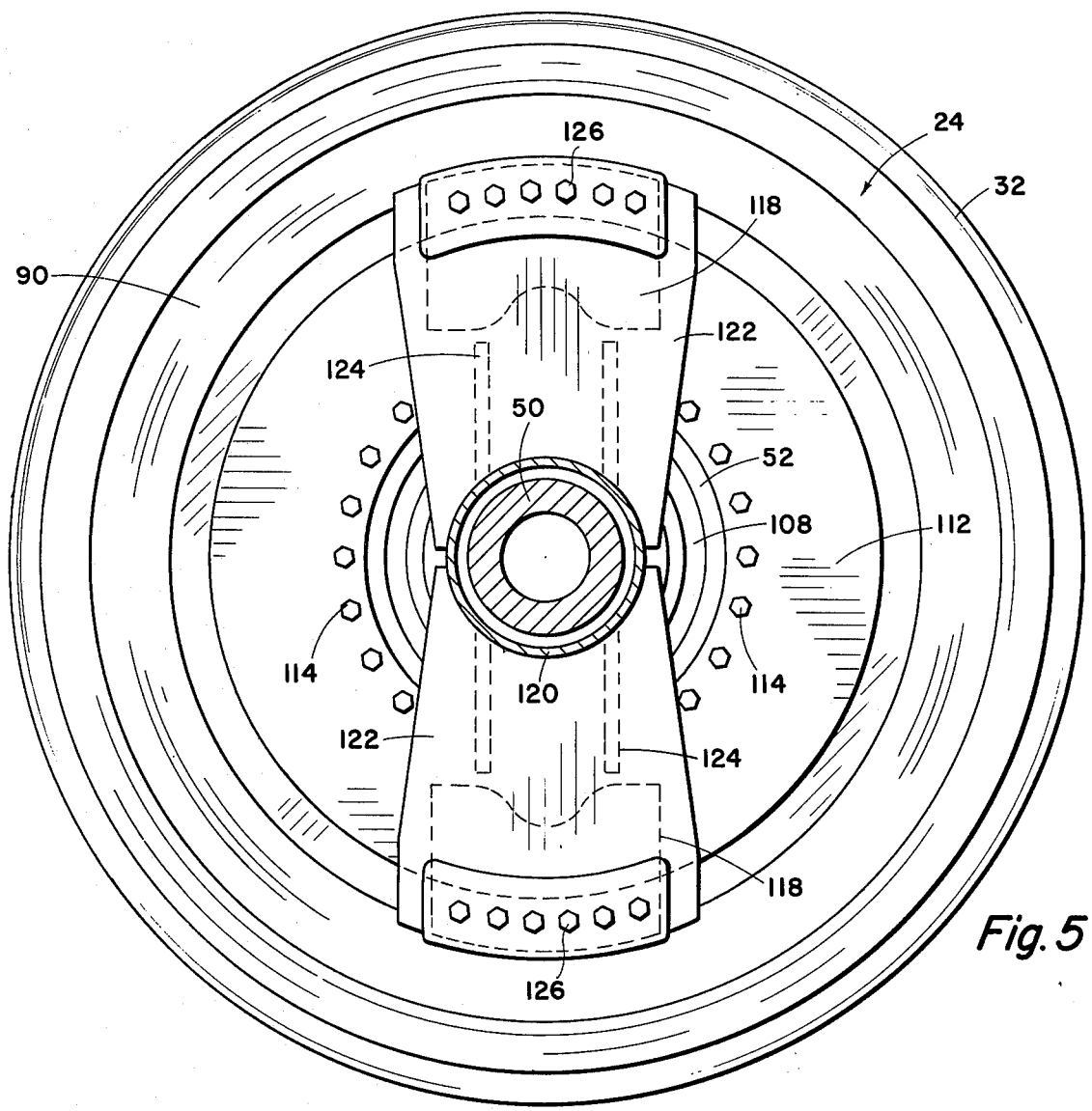
FIG. 5 is a view taken on line 5—5 of FIG. 3, but of a reduced size for illustrating the entire wheel rim and brake mechanism.

An axially extending sleeve 120 may be welded or otherwise rigidly secured to the inboard end of the axle 50 and extends inwardly from the inboard end of the sleeve 26 or tire rim 24 for supporting a pair of oppositely disposed brake calipers 122. The brake calipers 122 may be welded to the outer periphery of the sleeve 120 and extend radially outwardly therefrom in opposite directions and particularly shown in FIG. 5. In addition, it may be preferable to weld suitable gussets or webs 124 between the outboard fact of the calipers 122 and the outer periphery of the sleeve 120 for strengthening the calipers 124. The brakes 118 are removably secured to the calipers 122 by bolts 126, or the like, as is well known, whereby the brakes 118 are disposed within the interior of the sleeve 26 and diametrically opposed with respect to the brake disc 112.

Figure 4:
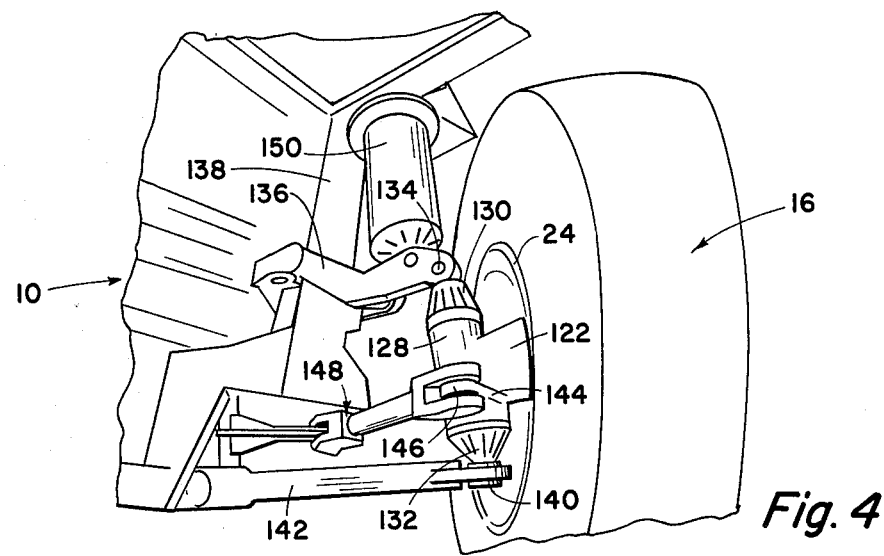
FIG. 4 is a perspective of the inboard side of a wheel mounted on an off-highway vehicle in a manner embodying the invention.

The brakes 118 may be of any suitabe type, such as electric, or pneumatically actuated, as desired. However, it is preferable that the brakes be of the pneumatically actuated type. As shown in FIG. 4, a substantially upright, but canted, hollow spindle 128 is rigidly secured to the calipers 122 in the substantial center thereof and is in open communication with the interior of the axle 50, whereby hydraulic lines (not shown), pneumatic lines (not shown), or the like may be extended through the internal passages for actuation of the brakes, steering system, or the like, thus providing added protection for the lines during operation of the vehicle 10. Of course, the opposite ends of the spindle 128 are closed by suitable connector elements 130 and 132 which may be utilized for connecting the spindle 128 to the vehicle 10 and thus connect the wheels 16 to the vehicle. For example, the connector element 130 is preferably provided with a suitable pivot connection 134 connected with a suitable structural element 136 of the vehicle 10 and which is in turn suitably pivotally connected with an A-frame structure 138 of the vehicle 10. The connector element 132 is preferably provided with a pivotal connection 140 connected with another suitable structural element 142, which is turn is suitably connected with the A-frame structure 138 of the vehicle 10. In addition, an outwardly extending flange 144 is provided on the outer periphery of the spindle 128 which is pivotally secured at 146 with the steering linkage assembly 148 which is utilized for steering of the wheels 16 in the manner set forth in the Goodbary et al co-pending application entitled, "DUAL STEERING SYSTEM FOR VEHICLES" Ser. No. 744,431, filed Nov. 23, 1976.

As also shown in FIG. 4, it is preferable to interpose a suitable suspension assembly 150 between the structural element 136 and the vehicle 10 in any well-known manner (not shown). The suspension assembly 150 not only facilitates the suspension of the wheels 16 from the vehicle 10 but also functions as a shock absorber for absorbing substantially all of the shock from the wheels 16 as the vehicle 10 is driven across rough terrain, or the like.

In operation, as the vehicle 10 is driven in either a forward or rearward direction, the axle 50 of each wheel 16 is held against rotation about its own longitudinal axis by virtue of the connection thereof with thd spindle 150 through the calipers 122. The wheel rim 24 and tire 16 are free to rotate with respect to the associate axle 50, however, due to the support of the housing 52 on the axle 50 by the spaced bearing assemblies 54 and 56. The sleeve 26 is connected with the housing 52 by the complementary rings 90 and 102 which are clamped to the opposite ends of the ring 100. Thus, the wheels 16 are secured to the vehicle 10 in a manner for free rotation during operation of the vehicle.

When it is necessary to stop the rotation of the wheels 16 for stopping the forward or rearward movement of the vehicle 10, the brakes 118 are activated in the usual manner for frictionally engaging or gripping the opposite faces of the brake disc 112. Since the brakes 118 are held stationary through connection with the structural elements of the vehicle 10, the braking engagement of the disc 112 will stop the rotation of the disc 112. Since the disc 112 is secured to the housing 52 through the bolted connection with the flange 110, the rotation of the housing 52 will be stopped, which in turn will stop the rotation of the sleeve 26. Thus, the rotation of the wheel 16 will be ceased upon the activation of the brakes 118.

The heat generated in the body of the disc 112 is extremely great during a braking operation because of the size and weight of the vehicle and load carried thereby. Under ordinary circumstances, brake discs of this type frequently "seize" or fuse to the support flange 110, or other supporting element therefor, because of the extreme heat generated, and it is substantially impossible to remove the disc from the assembly for replacement or repair. The relief groove 113, however, dissipates the heat in the material of the disc 112; and consequently, it has been found that the disc 112 remains entirely free of the flange 110, with the exception of the bolted connection therewith, and removal and/or replacement of the disc 112 is a simple matter.

In addition, when it is necessary to remove the rim 24 from the axle 50 and housing 52 for any reason, the ring 102 may be quickly and easily unbolted from connection with the ring 90, and removed from the interior of the rim. This frees the connection of the rim with the housing 52, and the rim 24 may be pulled away from the axle in the outboard diretion for ease of removal from the vehicle 10. In order to replace the rim 24 in position around the axle 50, the rim may be moved over the axle 50 and housing 52 in an inboard direction until the ring 100 engages the ring 90. The ring 102 may then be bolted to the ring 90 and tightened thereagainst as hereinbefore set forth for securing the rim 24 in position around the axle 50 and housing 52.

From the foregoing, it will be apparent that the present invention provides a novel center support for securing a wheel rim to the wheel axis of an off-highway vehicle. The novel center support comprises a non-rotatable spindle or axis secured to the vehicle, and a housing rotatably supported by the axle for independent rotation with respect thereto. The housing is removably secured to the inner periphery of the wheel rim in a manner for simultaneous rotation therebetween in the engaged position, and for release of connection therebetween in the disengaged position. The wheel rim may be quickly and easily removed from the associated wheel axle and housing, and quickly and easily installed thereon.

In addition, a heat dissipating relief groove is provided on the inner periphery of the brake disc associated with the wheel support structure for substantially precluding adhering of the disc to the wheel support structure during a braking operation. Thus, the disc is maintained completely independent of the wheel support structure at all times for facilitating removal of the disc for repair, replacement, or the like.

Whereas the present invention has been described in particular relation to the drawings attached hereto, it should be understood that other and further modifications, apart from those shown or suggested herein may be made within the spirit and scope of this invention.

What is claimed is:

1. In combination with a wheel rim for a vehicle, center support means removably secured within said wheel rim for rotatably and removably securing the rim to the vehicle and including rotatable means and non-rotatable means, caliper brake means secured to the non-rotatable means of the center support means, rotatable brake disc means removably secured to the rotatable means of the center support means and selectively engagable by said caliper brake means, and heat relief groove means provided on the inner periphery of the brake disc means for dissipating heat to preclude adhering of the brake disc member to the center support means.

2. The combination as set forth in claim 1 wherein the center support means comprises a non-rotatable axle member secured to the vehicle and substantially centrally disposed within said wheel rim, housing means concentrically disposed around said axle member, bearing means interposed between said axle member and housing means whereby said housing means is freely rotatable about its own longitudinal axis, annular ring means rigidly secured to the outer periphery of said housing means and having an outer diameter slightly less than the inner diameter of the wheel rim, substantially cylindrical ring means rigidly secured to the inner periphery of the wheel rim and having one end engagable with the annular ring means in one relative position between the wheel rim and housing means, and second annular ring means engagable with the opposite end of the cylindrical ring means, means for removably securing the second annular ring means to the cylindrical ring means and the first annular ring means in the engaged position therebetween.

3. The combination as set forth in claim 1 wherein the brake disc means comprises an annular brake disc removably secured to the center support means, and said heat relief groove means is provided on the inner periphery of said brake disc means.

4. In combination with a wheel rim for a vehicle, center support means removably secured within said wheel rim for securing the rim to the vehicle and comprising non-rotatable axle means secured to the vehicle, housing means concentrically disposed around said axle means and rotatably supported thereby for independent rotation with respect thereto, means cooperating between the housing means and the wheel rim for removably securing the housing means and axle means to the wheel rim, annular brake disc means removably secured to the housing means for rotation simultaneously therewith, and brake caliper means secured to the axle means for selective engagement with the brake disc means for precluding rotation of the housing means and wheel rim.

5. The combination as set forth in claim 4 wherein the last-mentioned means comprises first ring means rigidly secured to the inner periphery of the wheel rim, second ring means rigidly secured to the outer periphery of the housing and engagable with the first ring in one relative position between the wheel rim and housing means, and third ring means removably secured to the second ring means and engagable with the first ring means in the engaged position of the first ring means with the second ring means.

6. The combination as set forth in claim 5 wherein the first ring means is provided with oppositely directed outwardly tapered ends, the second ring means is provided with a tapered outer periphery complementary to one tapered end of the first ring means, and the third ring means is provided with a tapered outer periphery complementary to the other tapered end of the first ring means.

7. The combination as set forth in claim 4 wherein dust cover means is removably secured to one end of said housing means and sealing means is interposed between the housing means and axle means at the opposite end of the housing means.

8. In combination with a wheel rim for a vehicle having rotatable means engagable with the wheel rim for rotation thereof and caliper brake means secured to the vehicle and cooperating with the rotatable means for selective stopping of the rotation of the wheel rim, the improvement comprising, an annular brake disc member removably secured to the rotatable means for rotative movement simultaneously therewith and selectively engagable by the caliper brake means for stopping the rotation, and annular relief groove means provided on the inner periphery of the brake disc member for dissipation of heat during the braking action to preclude fusing of said brake disck to said rotatable means during a stopping operation.

9. In combination with a wheel rim for a vehicle, a non-rotatable axle member secured to the vehicle and substantially centrally disposed within said wheel rim, housing means concentrically disposed around said axle member, bearing means interposed between said axle member and housing means whereby said housing means is freely rotatable about its own longitudinal axis, an outwardly extending circumferential flange secured to the outer periphery of the housing means, annular ring means rigidly secured to the outer periphery of the flange and having an outer diameter slightly less than the inner diameter of the wheel rim, substantially cylindrical ring means rigidly secured to the inner periphery of the wheel rim and having one end engagable with the annular ring means in one relative position therebetween, second annular ring means engagable with the opposite end of the cylindrical ring means, means for removably securing the first and second annular ring means to the cylindrical ring means in the engaged position therebetween, annular brake disc means removably secured to the outer periphery of the housing means and rotatably therewith, annular groove means provided on the inner periphery of the brake disc means for heat dissipation, and caliper brake means secured to the axle member and operable for selective engagement with the brake disc means for precluding rotation of the housing means and wheel rim.

* * * * *